United States Patent [19]

Foulkes

[11] Patent Number: 4,761,534
[45] Date of Patent: Aug. 2, 1988

[54] LASER APPARATUS

[75] Inventor: Thomas L. Foulkes, Leyland, Great Britain

[73] Assignee: N.I.S. Limited, Chorley, United Kingdom

[21] Appl. No.: 924,999

[22] PCT Filed: Feb. 24, 1986

[86] PCT No.: PCT/GB86/00097

§ 371 Date: Oct. 23, 1986

§ 102(e) Date: Oct. 23, 1986

[87] PCT Pub. No.: WO86/04847

PCT Pub. Date: Aug. 28, 1986

[30] Foreign Application Priority Data

Feb. 23, 1985 [GB] United Kingdom ............... 8504732
Mar. 1, 1985 [GB] United Kingdom ............... 8505296

[51] Int. Cl.$^4$ ............................................. B23K 26/00
[52] U.S. Cl. .......................... 219/121.8; 219/121.63; 219/121.67; 219/121.74
[58] Field of Search ................ 219/121 LW, 121 LC, 219/121 LD, 121 LG, 121 LN, 121 LQ, 121 LP, 121 LB, 121 LU, 121 LZ, 121 FS; 350/611, 614, 624

[56] References Cited

U.S. PATENT DOCUMENTS 3,571,555 3/1971 Townes et al. .......... 219/121 LV X
4,049,945 9/1977 Ehlscheid et al. .......... 219/121 LM

FOREIGN PATENT DOCUMENTS 0077405 4/1983 European Pat. Off. .
2190568 2/1974 France .
2352624 12/1977 France .
0163091 9/1984 Japan ........................... 219/121 LZ
0064790 4/1985 Japan .
2104652 3/1983 United Kingdom .

Primary Examiner—C. L. Albritton
Attorney, Agent, or Firm—Spensley Horn Jubas & Lubitz

[57] ABSTRACT

Laser apparatus for performing operations on a workpiece (6) comprises a laser source (2) supplying a laser beam (4) which may be focused onto the workpiece (6) by a focusing unit (3). A representation of the surface of the workpiece (6) is generated by sensing means (7) which are associated with a computer (8). An image of the surface can be displayed on, for example, a VDU which allows an operator to determine a line across which the beam (4) should scan. The laser source (2) is then operated and the beam (4) is caused to scan along the selected line by appropriate movement of focusing unit (3) by a control unit (10) associated with the computer (8). Focusing unit (3) may be of variable focal length so as to ensure that the beam (4) is always focused on the surface of the workpiece.

8 Claims, 2 Drawing Sheets

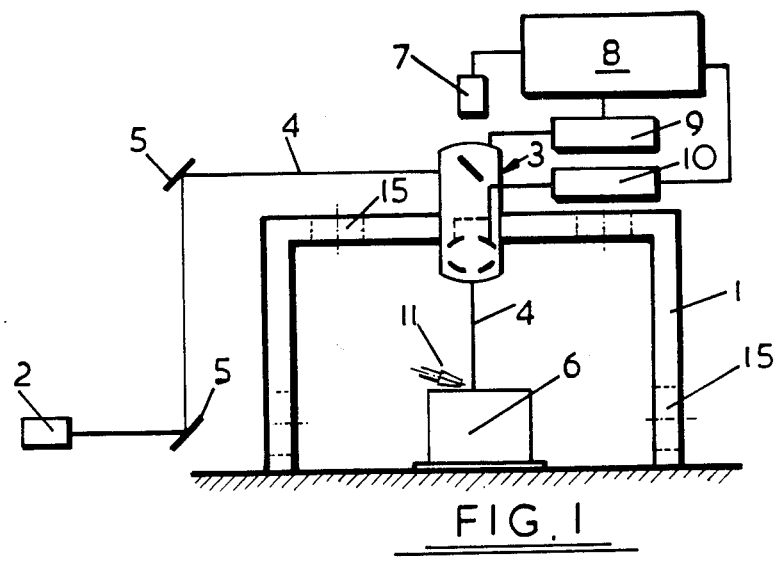
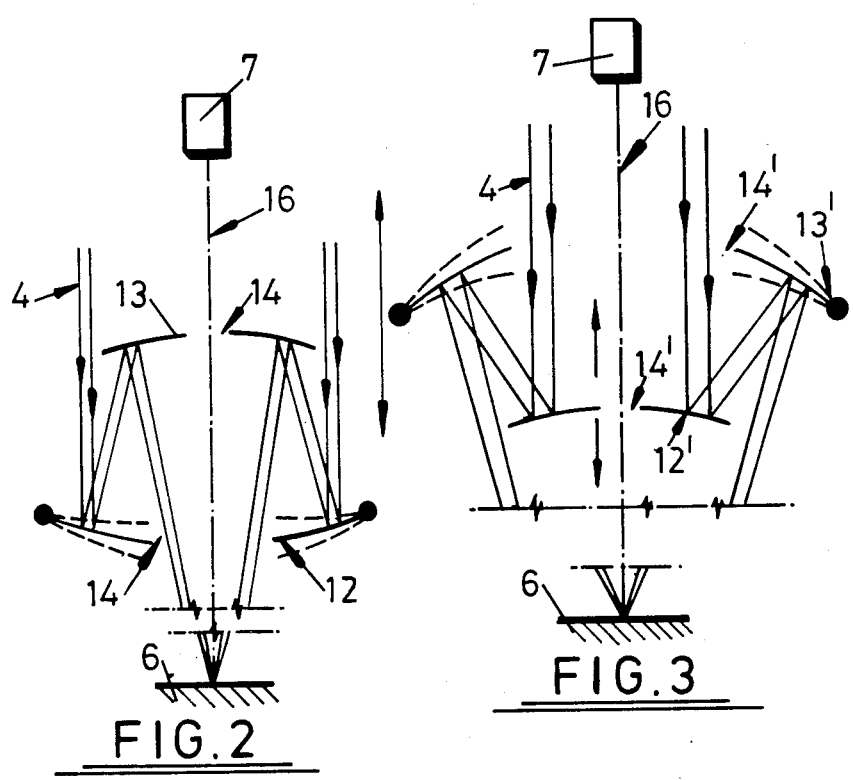

LASER APPARATUS

The present invention relates to laser apparatus. Processing by the application of a laser beam (e.g. for cutting or welding a metal workpiece) is well known and it is an object of this invention to provide improved apparatus for effecting such operations.

According to the present invention there is provided laser apparatus for performing operations on a workpiece, the apparatus comprising a laser source, means for focusing a laser beam from said source onto the workpiece, computing means, surface sensing means remote from the workpiece and associated with the computing means for determining a representation of a surface of the workpiece, and means associated with the computing means for causing the focused laser beam to move relatively across a surface of the workpiece in accordance with parameters entered into the computing means.

Preferably the apparatus additionally comprises a housing in which the workpiece may be located.

In a first embodiment of the invention, the means for focusing the laser beam is positioned remote from the workpiece and is of variable focal length.

This focusing means may, for example, be pivotal so that the beam scans across the workpiece. During this scanning the focal length of the focusing unit is controlled so that the beam is always focused at the surface of the workpiece.

This embodiment of the invention overcomes a disadvantage of prior art apparatus in which a laser focusing head is moved in close proximity to a workpiece. In such prior apparatus splashes of molten material from the workpiece may enter the focusing head due to its close proximity to the workpiece. This molten material could solidify on the lens and cause considerable difficulties and often catastrophic failure of the lens. Failure of the lens unit would render the whole system inoperable until a replacement could be fitted. In hazardous conditions, e.g. radioactive contamination of the work enclosure, several problems concerning operator safety could be successful replacement of the lens. These problems are overcome by the first embodiment of the invention.

In a second embodiment of the invention, the focusing means may be mounted on a flexible beam guide, and the movement of the focusing means across the workpiece is controlled by a robot. Such an apparatus provides for totally automatic operation which is particularly useful for performing laser processing applications in hazardous environments.

The invention will be further described by way of example only with reference to the accompanying drawings in which:

FIG. 1 is a schematic representation of one embodiment of apparatus in accordance with the invention;

FIG. 2 is a detail of one embodiment of a variable focal length focusing unit for use in the apparatus shown in FIG. 1;

FIG. 3 shows a further embodiment of variable focal length focusing unit;

Figure 4:
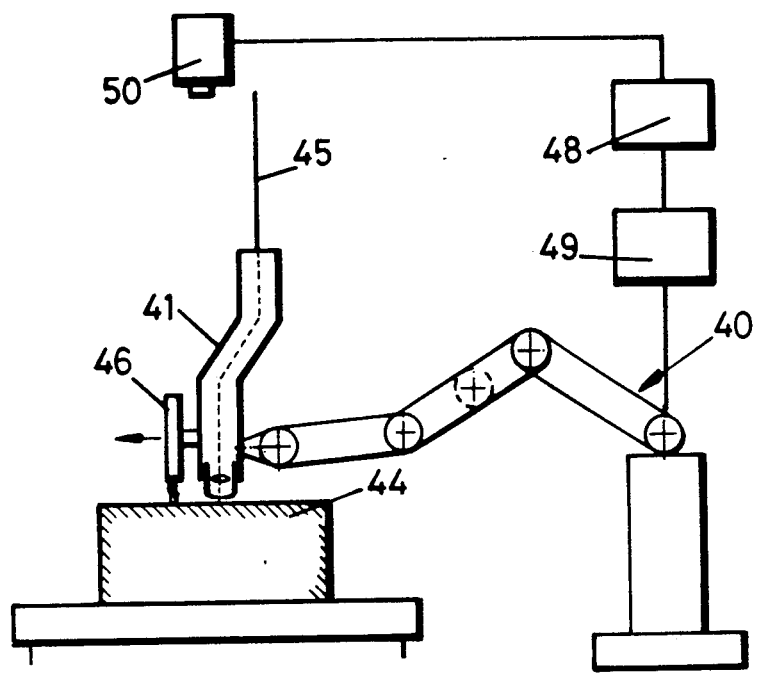
FIG. 4 is a schematic representation of a second embodiment of apparatus in accordance with the invention.

The apparatus illustrated in FIG. 1 comprises:
a. Workpiece Housing 1,
b. Laser beam source (external to the housing) 2,
c. Beam focusing unit 3 remotely positioned from the workpiece, and used for focusing the laser beam from the source 2 onto the workpiece,
d. Beam deflectors 5 serving to direct the beam from source 2 to the focusing unit 3,
e. Remote surface sensing unit 7 used to determine the profile of the workpiece surface,
f. Computing unit 8 used to process information gathered from the remote surface sensing unit 7 and direct the scanning control unit (see below),
g. Scanning control unit 9 used to 'steer' the focused laser beam via the beam focusing unit 3,
h. Focus control unit 10 receiving commands derived from the processed information via the remote surface sensing unit 7 and computing unit 8 to accurately focus the laser beam via the beam focusing unit 3 and,
i. Nozzle 11 whose function will be described by example in later paragraphs.

It is intended that the illustrated apparatus be used for processing large workpieces in harsh or hazardous environments (e.g. high levels of radioactive contamination) and for this purpose the beam 4 will be of high power. The beam 4 will be of annular cross-section.

Focussing unit 3 serves to focus the laser beam 4 onto workpiece 6. The unit 3 is of variable focal length and examples of suitable units will now be described with reference to FIGS. 2 and 3.

The focusing unit 3 illustrated in FIG. 2 comprises a pair of opposed concave focusing mirrors 12 and 13 each having aligned central apertures 14. It can be seen that mirror 13 is located within the annular beam 4 the path of which to the point of focus on the workpiece 6 is clearly illustrated. Mirror 12 is of variable curvature controlled by the focus control unit 10. Thus, beam 4 may (by varying the curvature of mirror 12) be focused at a greater or lesser distance from the focusing unit 3.

The focusing unit 3 illustrated in FIG. 3 comprises an annular convex focusing mirror 12' opposed to an annular concave focusing mirror 13', both of which having aligned central apertures 14'. The path of laser beam 4 to its point of focus on a workpiece 6 is clearly shown. Mirror 13' is of variable curvature as shown by broken curves. Additionally each of mirrors 12' and 13' are movable in accordance with arrows 'B'. Laser beam 4 may thus be scanned across workpiece 6 and focused at any point thereon by a combination of movements in accordance with arrow 'B' and the variable curvature of mirrors 13'. The movements of mirrors 12' and 13' are controlled by the focus control unit 10.

The focusing unit 3 is illustrated as being mounted centrally within the 'ceiling' of housing 1 although it may be mounted at any of a number of locations 12 positioned around housing. In each of these locations the unit 3 is capable of being moved along appropriate axes, under the control of the scanning control unit 9, so that beam 4 may be scanned across the workpiece 6. Since several different locations 12 are provided, the beam may be scanned across any surface of the workpiece 6.

It will be seen that, at each of the locations 12, the unit 3 is at a 'stand-off' distance from the workpiece 6, and this distance may be considerable.

The surface sensing unit 7 is comprised of a low power laser source (generating a beam '16'—see FIGS. 2 and 3) and a beam detector. This unit may be conventional range finding equipment.

In use of the apparatus, the surface sensing unit 7 is used in conjunction with the computing unit 8 to determine a representation of a surface of the workpiece 6. To accomplish this a laser beam 16 is directed through apertures 14 or 14' so as to strike the surface of the workpiece 6, the returning beam being detected by the beam detector so that it is possible, by known techniques, to determine the distance between the sensing unit 7 and the point at which the beam 16 strikes the surface of the workpiece.

This distance is stored by the computing unit 8 and by scanning the beam 16 across the surface of the workpiece 6 it will be appreciated it is possible to produce in the computing unit 8 a representation of the surface being scanned. This process may be repeated for any other surface of the workpiece 6 by relocating the focusing unit 3 with the associated surface sensing unit 7 to any of the locations 15 in the housing.

Pictorial representations of the surfaces may then be built up by digital imaging techniques and displayed on a VDU (not shown) associated with the computing unit 8. The operator of the equipment can now determine by inspection of the representations the best surface along which the workpiece 6 should be processed, together with the best line for the processing along that surface. By using, for example, a light pen or other means, the operator may mark that processing line on the VDU.

In order to effect the desired process, the focusing unit 3 is positioned at the required location 15 and laser source 2 is activated to generate beam 4.

On the basis of the desired processing line input to the computing unit 8 the latter is able to control the scanning control unit 9 and the focus control unit 10 to cause the beam 4 via the focusing unit 3 to effect the desired operation. In detail, the scanning control unit 9 causes the focusing unit 3 to be moved in such a way that beam 4 translates along the line of processing at the desired speed while simultaneously the focusing control unit varies the internal mechanisms of focus unit 3, so that the beam is always in focus on said surface whilst processing is effected.

During processing, nozzle 11 is scanned along the said processing line so as always to be in close proximity to the point at which beams 4 impinges on the surface whereby gas issuing from the nozzle 11 assists the processing operation.

It will be appreciated that the illustrated apparatus (FIG. 1) has a number of advantages.

Firstly, the stand off distance between focusing unit 3 and the workpiece 6 ensures that problems associated with splashes of molten metal damaging the optics do not occur.

Secondly, the focusing unit 3 is easily accessible for maintenance purposes and this is particularly advantageous if the apparatus is to be used for cutting contaminated workpieces since such workpieces may be introduced into housing 1, and there is no need for personnel to enter the contaminated housing should the focusing unit 3 require maintenance.

It should also be appreciated that a number of modifications may be made to the illustrated apparatus. For example, focusing unit 3 may remain stationary during processing whilst workpiece 6 is moved under the control of scanning control unit 9 so that beam 4 effects the desired cut.

Although the invention has been described with specific reference to the use of a laser range finder it should be appreciated that other surface detection means may be used, e.g. Infra Red sensing or T.V. cameras, or others.

Figure 5:
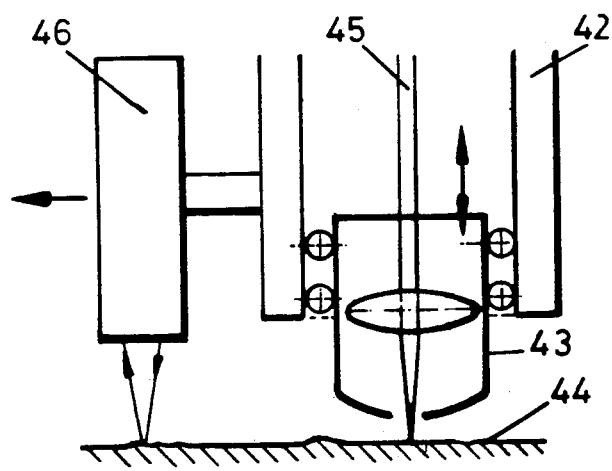
FIG. 5 is a detail of FIG. 4.

FIGS. 4 and 5 illustrate an alternative embodiment of the invention. In this embodiment, a robot arm 40 (which may be positioned in a housing not shown) is associated with a flexible beam guide 41 provided at its end 42 with a focusing head 43. This focusing head 43 is of fixed focal length and is mounted for relative movement within the guide end 42 (see FIG. 2).

Robot arm 40 may be a 5 or 7 axis unit capable of moving the guide 41 so that head 43 may be scanned across any surface of a workpiece 44 to be processed. Beam guide 41 is of known construction and guides a laser beam 45 (from a source not shown) to focusing head 43 irrespective of the position to which the head has been moved by robot 40.

Provided on the end 42 of guide 41 is a conventional laser range finder unit 46, the purpose of which will be described later.

Also associated with the apparatus is a computing unit 48, a robot control unit 49, and a stereo video camera 50. Camera 50 is associated with computing unit 48 and is used to provide an image of the surfaces of the workpiece 44. As previously, this representation may be displayed on a VDU and an operator may select a line of cut using a light pen. Robot control unit 49 (under the control of computing unit 48) then controls robot 40 so that laser beam 45 (focused by the head 41 onto the surface of workpiece 44) translates along the selected line of cut.

As mentioned above, focusing head 43 is of fixed focal length. The purpose of laser range finder 46 is to travel in advance of focusing head 43 as it scans across workpiece 41 and detect surface imperfections, e.g. recesses, undulations etc. Information from range finder 46 is used to control movement of head 43 within the end of tube 41 so that the beam 45 will always be focused on the surface of the workpiece, irrespective of any surface imperfections.

Although not specifically illustrated the apparatus of FIGS. 4 and 5 may of course be provided with a nozzle (equivalent to nozzle 11 of FIG. 1) for directing a gas jet at the workpiece.

I claim:

1. Laser apparatus for performing operations on a workpiece comprising:

a laser source, computing means, surface imaging apparatus remote from the workpiece for forming a representation of a surface of the workpiece, said imaging apparatus being associated with said computing means whereby said representation may be stored in said computing means, focusing means remote from the workpiece for focusing the laser beam from said source onto the workpiece, translation means operable under the control of the computing means for translating the beam in a line relatively across the surface of the workpiece in accordance with a selected input to the computing means and, focus control means under the control of said computer means for adjusting the focus of the laser beam in accordance with the three dimensional characteristics stored in the computer of the surface along the line along which the beam translates relative to the workpiece for maintaining the focus of the laser beam at the predetermined position relative to said surface.

2. Laser apparatus as claimed in claim 1, additionally comprising a housing in which a workpiece may be located during its processing by the laser beam.

3. Laser apparatus as claimed in claim 1, wherein the means for focusing the laser beam is of variable focal length which is controlled to maintain said predetermined focus.

4. Laser apparatus as claimed in claim 2, wherein the means for focusing the laser beam is of variable focal length which is controlled to maintain said predetermined focus and the housing has a plurality of mounting positions at any one of which the focusing means may be positioned.

5. Laser apparatus as claimed in claim 3, wherein the focusing means comprises opposed mirrors, at least one of which is of variable curvature to provide for said variable focal length.

6. Laser apparatus as claimed in claim 1 wherein the surface imaging apparatus comprises laser range finding means.

7. Laser apparatus as claimed in claim 5, wherein surface imaging apparatus comprises laser range finding means and the opposed mirrors have aligned apertures through which a beam from the range finding means may pass.

8. Laser apparatus as claimed in claim 3, wherein the focusing means is movable relative to a plurality of axes.

* * * * *